July 31, 1962 H. R. HUDSON 3,047,751
MOTOR-POTENTIOMETER ASSEMBLY
Filed May 4, 1959
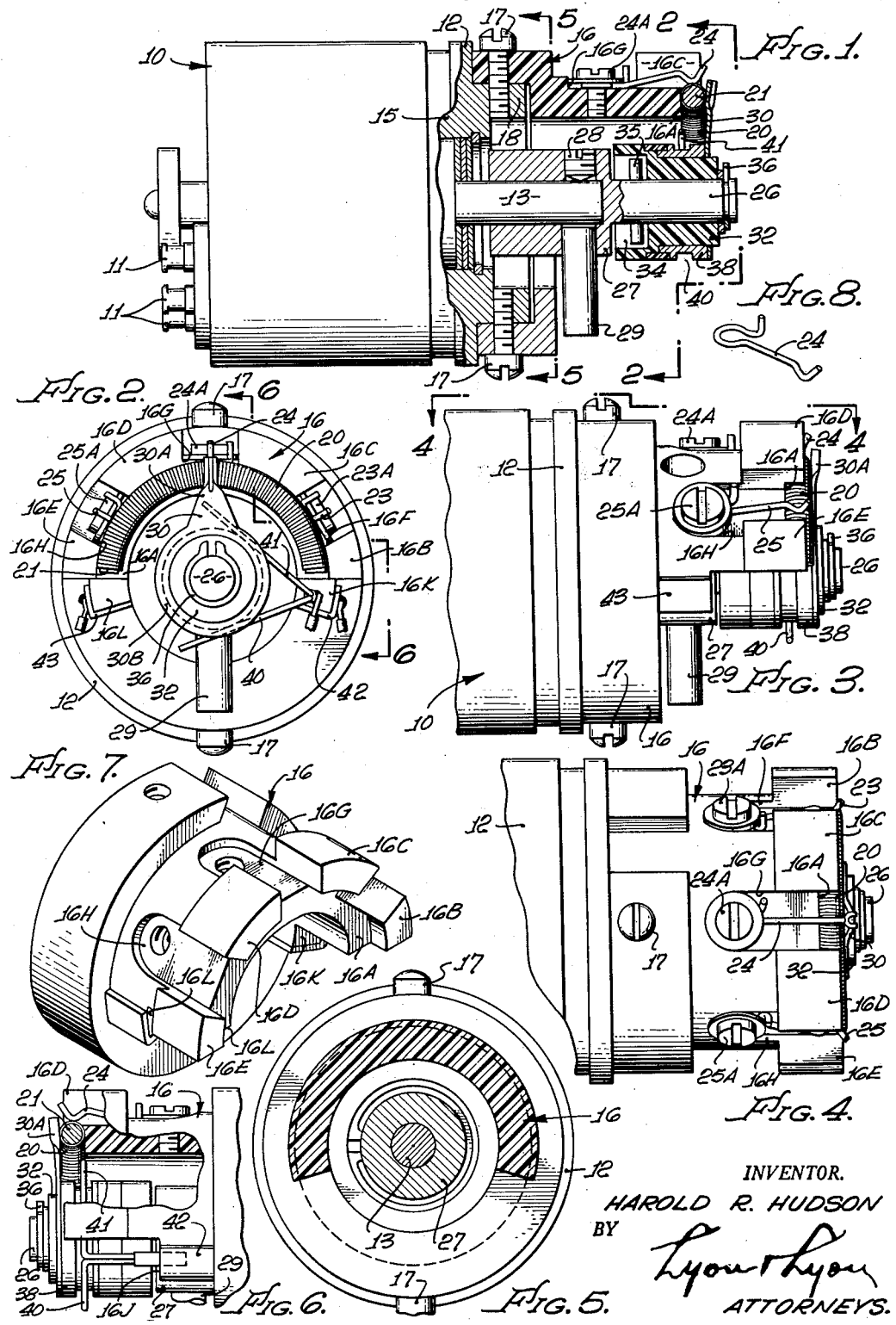
INVENTOR.
HAROLD R. HUDSON
BY
ATTORNEYS.

United States Patent Office 3,047,751
Patented July 31, 1962

3,047,751
MOTOR-POTENTIOMETER ASSEMBLY
Harold R. Hudson, Santa Monica, Calif., assignor to Molectronics Corporation, a corporation of California
Filed May 4, 1959, Ser. No. 810,744
9 Claims. (Cl. 310—72)

The present invention relates to a motor-potentiometer assembly.

It is oftentimes desirable in electrical systems to incorporate a potentiometer-type resistance having a wiper arm controlled by a servo motor. In such case it is oftentimes desirable that such assembly be of small size because of space requirements and that the movable elements be of small mass to avoid excessive inertia effects which otherwise may result in a sluggish servo controlled system.

These desirable conditions are produced in accordance with the present invention by mounting the wiper arm of a potentiometer-type resistance directly on an extension of the servo motor shaft and by mounting the resistance strip of the potentiometer directly on an insulated extension of the motor casing, thereby avoiding the necessity of providing additional bearings for the movable element of the potentiometer. Stated more briefly, there is provided in accordance with an important feature of the present invention, a potentiometer-type resistance which requires no bearings other than those bearings already present in the servo motor which drives the movable element of the potentiometer. By eliminating the potentiometer bearing there is, of course, less friction and the servo motor may thus be made smaller than is otherwise required in prior art arrangements wherein a potentiometer-type resistance is ganged to the motor shaft with or without the bearings in the motor and potentiometer being exactly mechanically aligned. Thus, another subsidiary feature of the invention is that in the present case there is no problem involved of alignment of different bearings.

It is therefore an object of the present invention to provide an improved motor-potentiometer assembly in which there is no potentiometer bearing other than those bearings required in the motor itself.

Another object of the present invention is to provide improved means and techniques whereby a servo motor in a motor-potentiometer combination may be made smaller for the intended purposes than is possible in prior art arrangements.

Another object of the present invention is to provide an improved motor-potentiometer assembly in which the frictional resistance and mass are reduced to a minimum to thereby gain advantages of a low-mass, low-friction assembly.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a view in elevation and partly in section of a motor-potentiometer assembly embodying features of the present invention.

FIGURE 2 is a view taken along the line 2—2 in FIGURE 1.

FIGURE 3 is a view in elevation of a portion of the assembly illustrated in FIGURE 1.

FIGURES 4 and 5 are sectional views taken on corresponding lines 4—4 and 5—5 in FIGURES 3 and 1, respectively.

FIGURE 6 is a sectional view taken substantially on the line 6—6 of FIGURE 2.

FIGURE 7 is a perspective view illustrating the portion of the potentiometer construction.

FIGURE 8 is a perspective view of a contact element.

Referring to the drawings, the motor-potentiometer assembly includes a conventional servo motor 10 having a series of seven terminals 11 for energization and control of the same. This motor has an outer casing 12 and a shaft 13, the casing 12 being provided with an annular shoulder portion 15 over which an annular insulated member 16 is mounted and secured by a pair of machine screws 17 passing through apertured portions of the member 16 and threaded in the flanged casing portion 18.

This insulated member 16 comprises generally an insulated support for the stationary parts of the potentiometer which include the arcuately formed resistance element 20.

The resistance element 20 comprising resistance wire spirally wound around an arcuate insulated mandrel 21 (FIGURES 1, 2 and 6) and the assembly is maintained on the arcuate portion 16A (FIGURE 7) using a suitable glue or bonding agent between the assembly 20 and member 16. For purposes of increasing mechanical rigidity, the member 16 is provided with a series of generally circumferentially spaced lugs 16B, 16C, 16D and 16E which overlie slightly the resistance element 20 as illustrated in FIGURE 3.

This resistance element 20 is contacted at three different points along its arcuate length by resilient contact members 23, 24 and 25 which are secured as cantilever elements on the member 16 by corresponding machine screws 23A, 24A and 25A, such machine screws serving also as electrical binding posts and are partially recessed in different recessed portions indicated at 16F, 16G and 16H as indicated in FIGURE 4.

The motor shaft 13 has secured thereto an extension shaft 26 which has an enlarged round portion at 27 bored to slip over motor shaft 13. Such enlarged motor shaft portion 27 is also provided with a set screw 28 for locking the shaft extension 26 to shaft 13; and a pin 29 is pressed in such enlarged portion 27 for purposes described later.

The insulated potentiometer wiper arm 30 is insulatedly mounted on the shaft extension 26 using the following construction.

A sleeve 32 of insulating material fits snugly over the shaft extension 26 to provide an adjustable frictional connection between the two. This sleeve 32 is grooved at 34 to receive a pin 35 extending through a lateral bore in shaft 26 so that the sleeve 32 is assured of being rotated when and as the shaft 26 is rotated; but the frictional connection between the sleeve 32 and the shaft 26 allows longitudinal adjusted movement of the sleeve 32 and the wiper arm 30 thereon so as to allow adjustment of the contact pressure developed between the wiper 30 and the resistance element 20. A conventional split lock ring 36 may be provided on the end of shaft 26 to assure retention of the sleeve 32.

The wiper arm 30, as shown, may be soldered or brazed to an outer metal sleeve or slip ring 38 which is suitably affixed as, for example, by a pressfit on the sleeve 32 for purposes of rigidity. The wiper arm 30 is, of course, sufficiently resilient for these purposes and, as illustrated, includes a resilient tab portion 30A (FIGURE 2) and an integrally formed circular portion 30B, such portion 30B being electrically contacted by the slip ring 38 which in turn is contacted by the two brush elements 40 and 41 in the form of cantilever supported wires having their ends suitably anchored as, for example, by pressfitting in an apertured portion 16J of the insulated member 16.

For purposes of limiting rotational movement of the armature shaft and for also providing limit switches, the insulated member 16 is formed with two abutments 16K, 16L (FIGURE 7) to which are bonded, by a suitable adhesive or bonding material, corresponding metal contacts 40 and 41. Such contact elements 40 and 41 cooperate both mechanically and electrically with the previously mentioned pin 29 to form what may be considered to be a single pole, double throw switch with, of course, the pin 29 being the movable element of the switch. These switches comprising contact elements 40 and 41 may, of course, be used in different ways as, for example, to produce an indication when the servo motor has been rotated to extreme positions or to operate relays for de-energizing the motor when the same reaches extreme positions.

While the particular embodiments of the present invention has been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A motor and potentiometer assembly including a motor having a casing, an armature shaft rotatably mounted in said casing and extending outwardly thereof, said casing having an annular shouldered portion coaxial with the axis of said shaft, an insulated member having a cylindrical portion with an integrally formed semi-cylindrical portion, said cylindrical portion being mounted on said shouldered portion, a resistance strip mounted on said semi-cylindrical portion, said shaft having an extension which is rotatably supported solely by said casing and a wiper arm mounted on said extension for rotation therewith and contacting said resistance strip.

2. An assembly as set forth in claim 1 in which said shaft extension has a pin extending therefrom for contacting said semi-cylindrical portion to form stop means.

3. An assembly as set forth in claim 2 in which said pin is engageable with contact members mounted on said semi-cylindrical portion to form a limit switch.

4. A motor and potentiometer assembly including a motor having a casing and a shaft, an insulating member mounted on said casing, a resistance strip mounted on said member, said shaft having an extension which is supported solely for rotation by the bearings of said motor, and a wiper arm on said extension for rotation therewith and contacting said resistance strip.

5. A motor-potentiometer assembly comprising a motor having a casing, a rotatable shaft supported for rotation in bearings in said casing, a member releasably mounted on said casing, a resistance strip on said member, said shaft having an extension mounted thereon, said extension being rotatably supported solely by said bearings, and a wiper arm on said extension for rotation therewith and contacting said resistance strip.

6. A motor-potentiometer assembly comprising a motor having a casing and a shaft rotatably supported in bearings in said casing, a resistance strip mounted stationarily with respect to said casing, and a wiper arm on said shaft for rotation therewith and contacting said resistance strip, said wiper arm being supported solely by said motor bearings.

7. In a motor-potentiometer assembly in which the shaft of a motor is mechanically coupled to a wiper arm of a potentiometer, the improvement which resides in mounting said wiper arm directly on the motor shaft for rotation therewith without any auxiliary bearings other than those bearings forming a part of the motor itself.

8. In a motor-potentiometer assembly, a motor having a casing and a shaft rotatably supported in bearings in said casing, an insulating member mounted on said casing, said member having a cylindrical portion affixed to said casing, and an integrally formed semi-cylindrical portion, an arcuate resistance strip mounted near the end of said semi-cylindrical portion, a shaft extension mounted on said shaft and supported solely by said bearings, a wiper arm mounted on said shaft extension for rotation therewith and contacting said resistance strip, said shaft extension having a laterally extending pin which is engageable with diametrically oppositely disposed edge portions of said semi-cylindrical portion.

9. An assembly as set forth in claim 8 in which said edge portions are each provided with electrical contact elements cooperating with said pin to form a single pole, double throw switch.

References Cited in the file of this patent

UNITED STATES PATENTS

| | | |
|---|---|---|
| 543,523 | Eske | July 30, 1895 |
| 1,122,534 | Perry | Dec. 29, 1914 |
| 1,551,752 | Kriesel | Sept. 1, 1925 |
| 1,950,341 | Foothorap | Mar. 6, 1934 |
| 2,239,043 | Kuehn | Apr. 22, 1941 |
| 2,393,189 | Richmond | Jan. 15, 1946 |
| 2,702,871 | Sparklin | Feb. 22, 1955 |